US006483994B2

(12) United States Patent
Kabe et al.

(10) Patent No.: US 6,483,994 B2
(45) Date of Patent: Nov. 19, 2002

(54) LENS DEVICE

(75) Inventors: Eiichi Kabe, Omiya (JP); Atsushi Misawa, Asaka (JP); Shigeru Kondo, Asaka (JP)

(73) Assignees: Fuji Photo Optical Co., Ltd., Saitama (JP); Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/790,658

(22) Filed: Feb. 23, 2001

(65) Prior Publication Data
US 2001/0017984 A1 Aug. 30, 2001

(30) Foreign Application Priority Data

Feb. 25, 2000 (JP) .......................................... 2000-49632

(51) Int. Cl.[7] .............................................. G03B 17/04
(52) U.S. Cl. ............................. 396/79; 396/85; 396/349

(58) Field of Search ........................... 396/349, 72, 79, 396/83, 85

(56) References Cited

U.S. PATENT DOCUMENTS 5,432,574 A * 7/1995 Miyazawa et al. .......... 396/349

FOREIGN PATENT DOCUMENTS

JP 06324392 A 11/1994

* cited by examiner

Primary Examiner—David M. Gray
(74) Attorney, Agent, or Firm—Birch, Stewart, Kolasch & Birch, LLP

(57) ABSTRACT

Back ends of guide bars that guide lens frames holding lenses are fixed to a base, and front ends of the guide bars are inserted into front end supporters provided on a middle frame. All the ends of the guide bars are supported, and thus the guide bars can stably move the lens frames.

17 Claims, 8 Drawing Sheets

LENS DEVICE

BACKGROUND OF THE INVENTION

1. Field of the Invention

The present invention relates generally to a lens device, and more particularly to a lens device for an electronic still camera.

2. Description of Related Art

A lens frame holding a lens is provided in a lens barrel. There are two methods of supporting the lens along an optical axis in the lens barrel.

In the first method, three projections are arranged on the outer periphery of the lens frame at regular intervals, and three grooves are formed along the optical axis on the inner periphery of a fixed barrel. The projections are coupled to the grooves so that the lens frame is guided along the optical axis. In the second method, guide bars are provided along the optical axis in the lens barrel, and guide blocks are provided on the lens frame. The guide bars are coupled with the guide blocks to guide the lens frame along the optical axis.

In the former method, though the lens frame is stably supported, the operating space for the lens frame is larger than that in the latter method, and this makes the lens barrel large.

In the latter method, all the ends of the guide bars are supported in case of a fixed focus lens or a relatively simple zoom lens, but only one end of each bar is supported in case of a recent zoom lens which becomes smaller in size. As disclosed in Japanese Patent Provisional Publication No. 6-324392, the back ends of the guide bars are fixed to the back surface of the lens barrel, and the front ends of them are not supported.

However, the guide bars shake when the lens is guided, and the lens can not be stably moved. If both ends of each guide bar are supported to stably move the lens, the lens barrel is large.

SUMMARY OF THE INVENTION

It is therefore an object of the present invention to provide a small lens device that permits stable movement of a lens.

The above object can be achieved by providing a lens device, comprising: a lens barrel including a movable barrel and a fixed barrel, wherein said movable barrel moves along an optical axis with respect to said fixed barrel; a support mechanism provided within the movable barrel, said support mechanism including a cylindrical middle frame and a presser ring, wherein said middle frame is slidable within the movable barrel; a lens frame holding a lens; and a guide bar that is arranged in the lens barrel to support said lens frame holding said lens so that the lens frame slides along the optical axis, wherein one end of the guide bar is fixed to a back end of the fixed barrel, and the other end of the guide bar is supported by the support mechanism provided within the movable barrel.

The supporter may be arranged in a supporting member that moves along the optical axis in the movable barrel.

According to the present invention, the back end of the guide bar is fixed to the back end of the fixed barrel, and the other end of the guide bar is supported by the supporter provided on the movable barrel. Both ends of the guide bar are supported, and the guide bar can stably move the lens. If the supporting member can move, it does not come into contact with other members in the lens barrel.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
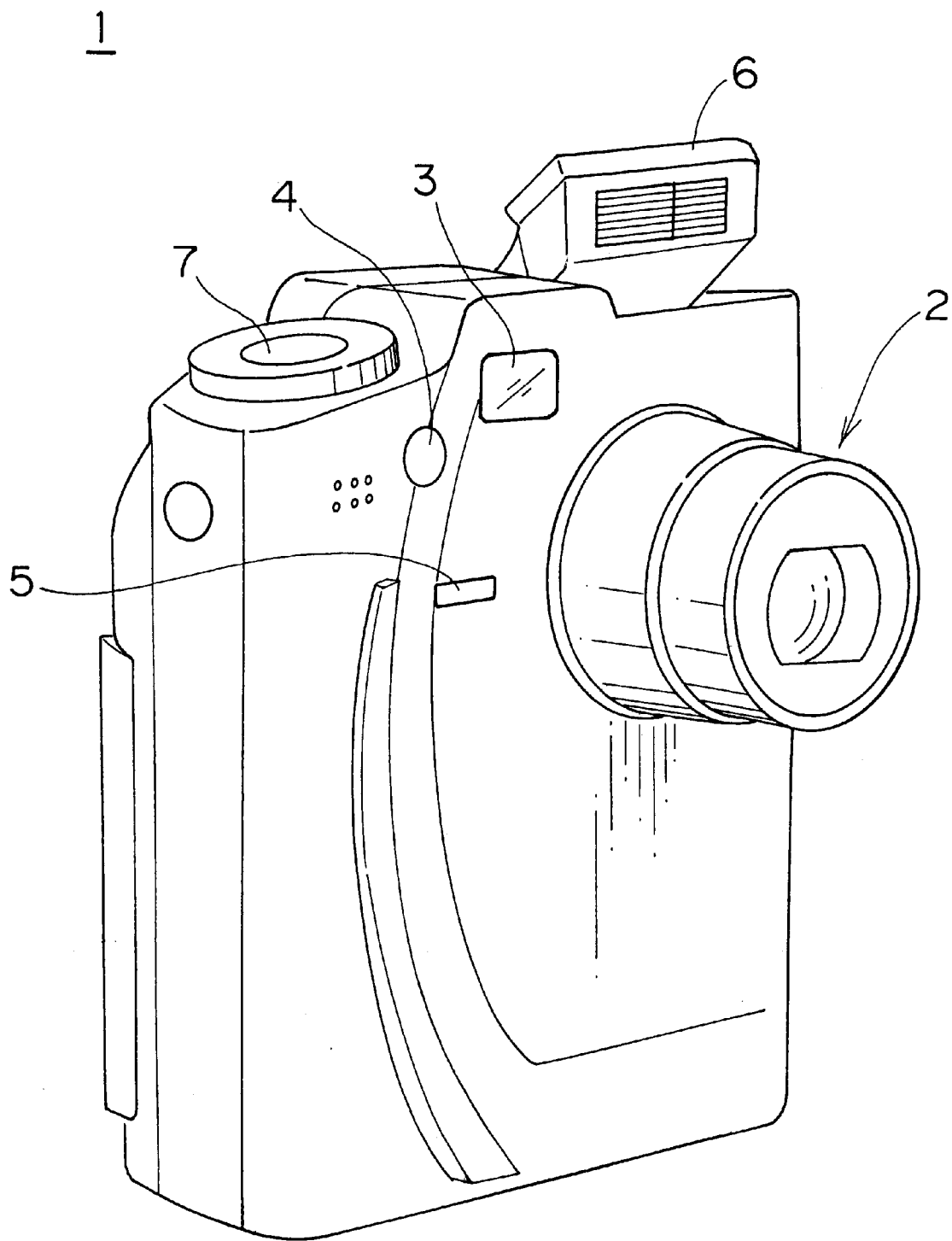
FIG. 1 is a perspective view showing the appearance of an electronic still camera (a lens device is projected)

FIG. 1 is a perspective view showing the appearance of an electronic still camera 1 to which a lens device 2 according to the present invention is applied.

As shown in FIG. 1, the body of the electronic still camera 1 is shaped like a rectangular box, and the lens device 2, a viewfinder window 3, an electronic flash light-adjusting sensor 4, a self-timer indicator 5, etc. are arranged on the front of the camera body. A retractable electronic flash 6 and a shutter release button 7 are provided on the top of the camera body. An eyepiece, a liquid crystal panel, control keys (not shown) and so on are arranged on the back of the camera body.

The lens device 2 can be collapsed, and it comes out of the front of the camera body only when the camera 1 is to be used.

Figure 2:
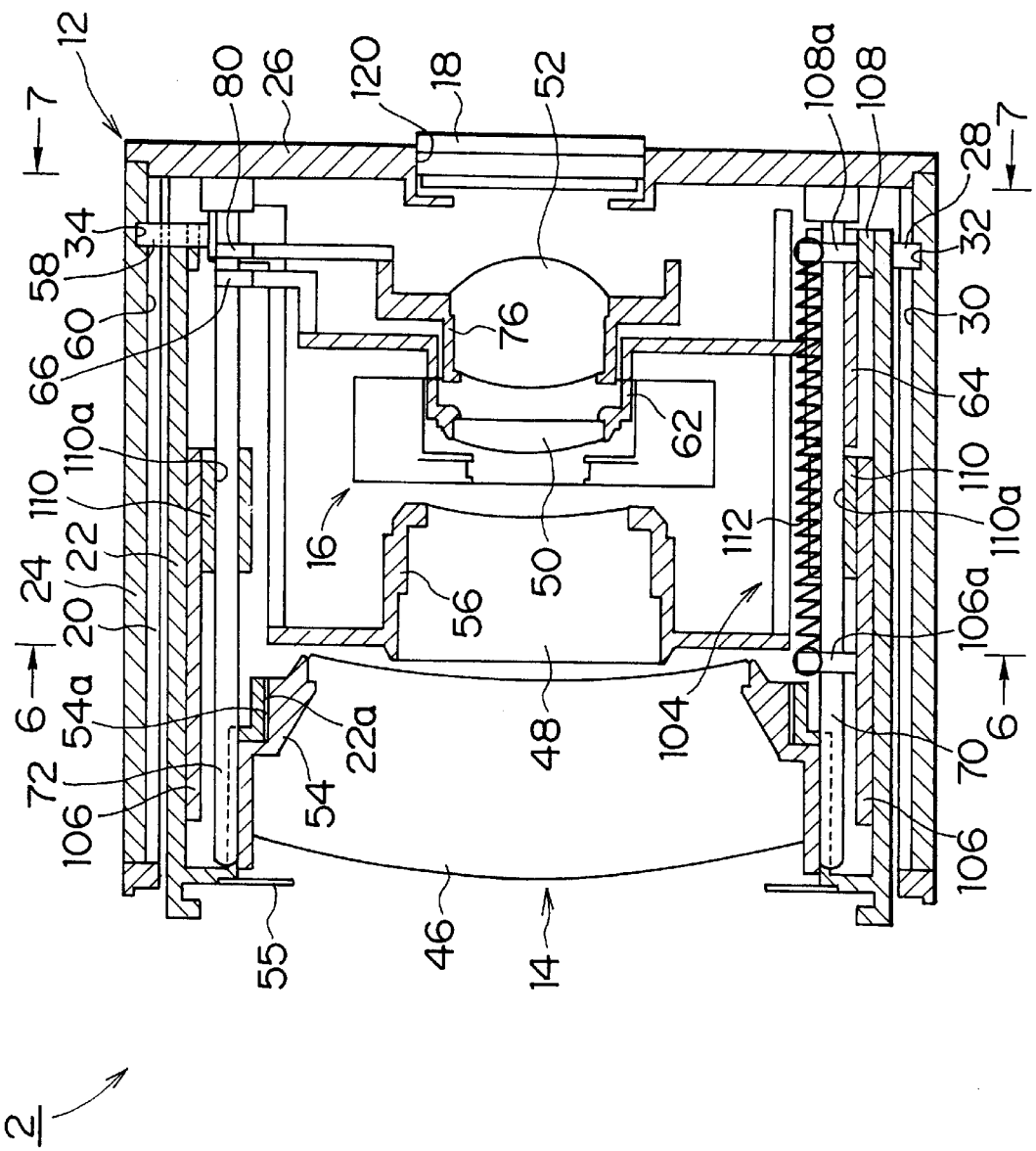
FIG. 2 is a cross section of the lens device (the lens device is collapsed)
Figure 3:
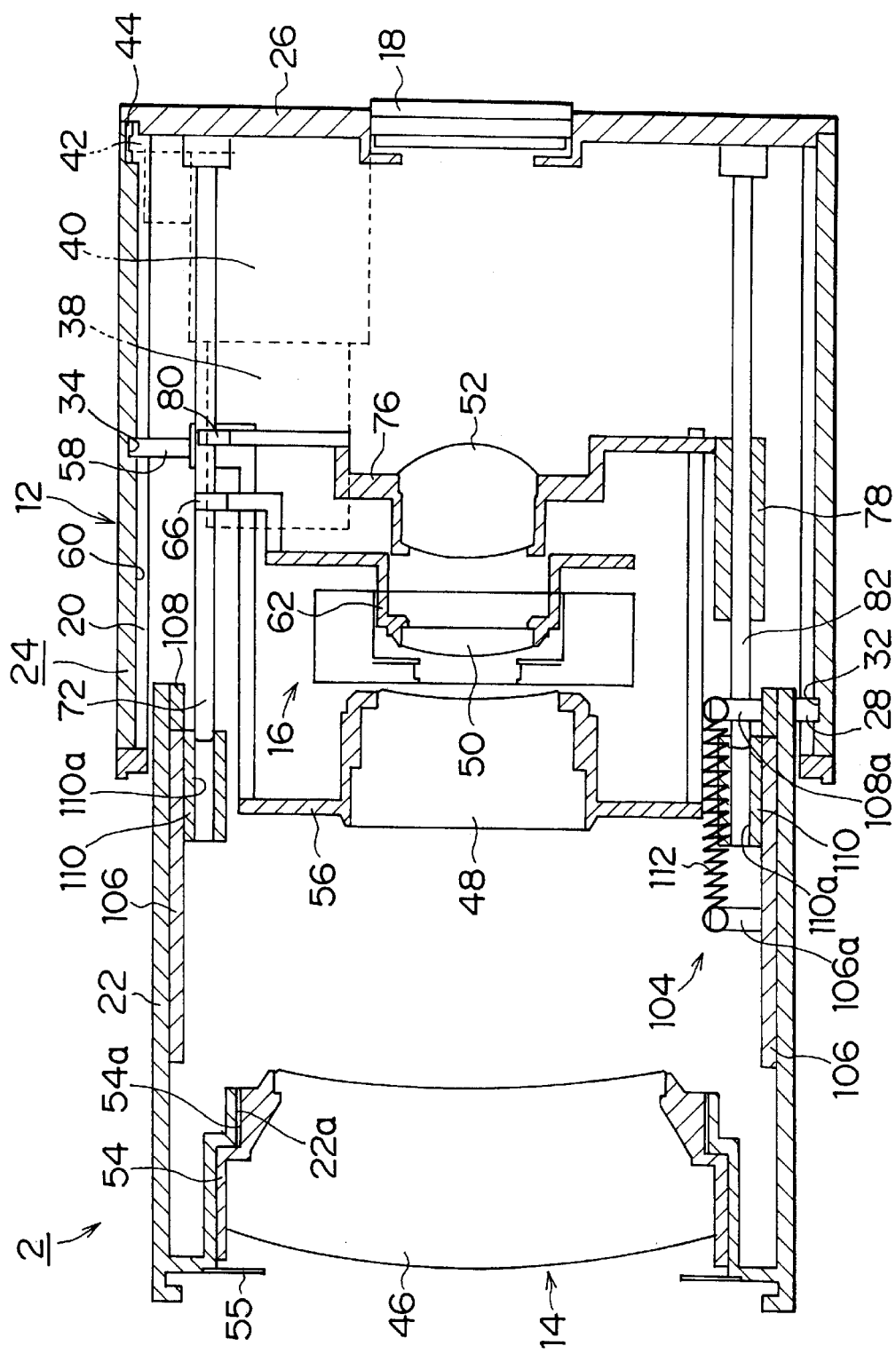
FIG. 3 is a cross section of the lens device (the lens device is projected at a wide-angle position)
Figure 4:
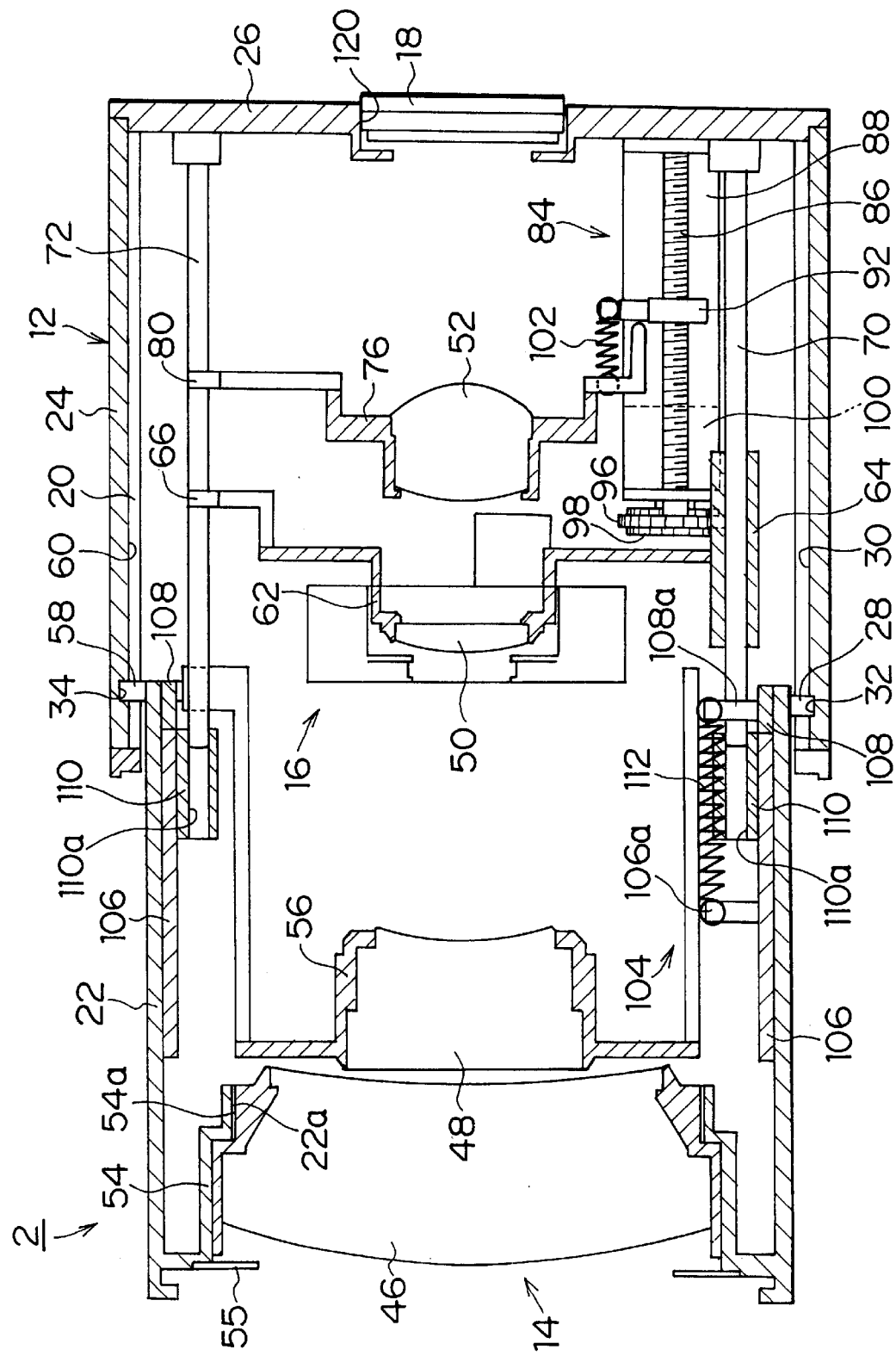
FIG. 4 is a cross section of the lens device (the lens device is projected at a telephoto position)
Figure 5:
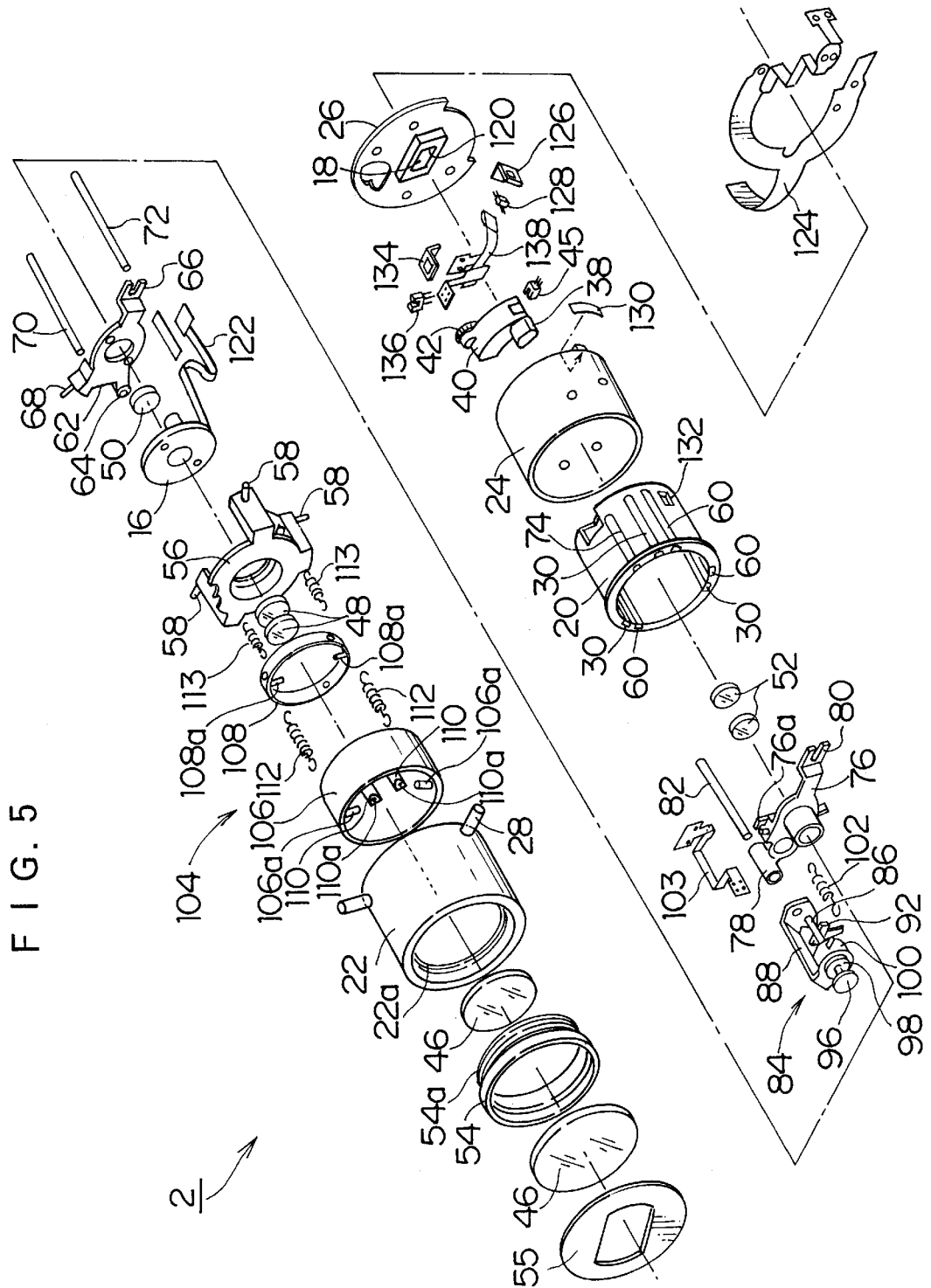
FIG. 5 is a disassembly perspective view of the lens device.

FIGS. 2, 3 and 4 are cross sections of the lens device 2, and FIG. 5 is a disassembly perspective view of the lens device 2. FIG. 2 shows the lens device 2 collapsed in the camera body, and FIGS. 3 and 4 show the lens device 2 stuck out of the camera body.

As shown in FIGS. 2–5, the lens device 2 is composed of a lens barrel 12, a taking lens 14, a diaphragm and shutter unit 16 and a CCD unit 18.

The lens barrel 12 comprises a fixed barrel 20, a movable barrel 22 that can move inside the fixed barrel 20, and a cam barrel 24 that can rotate around the fixed barrel 20.

The fixed barrel 20 is shaped like a cylinder, and a base 26 is attached to an end of the fixed barrel 20. The base 26 is fixed to the camera body to attach the lens device 2 to it.

The movable barrel 22 is shaped like a cylinder, and it can move forward and backward inside the fixed barrel 20. Three first cam pins 28 are arranged on the outer periphery of the back end of the movable barrel 22 at regular intervals to couple with three first slits 30 formed in the fixed barrel 20. The first slits 30 are formed along an optical axis, and the movable barrel 22 can move along the optical axis.

Figure 8:
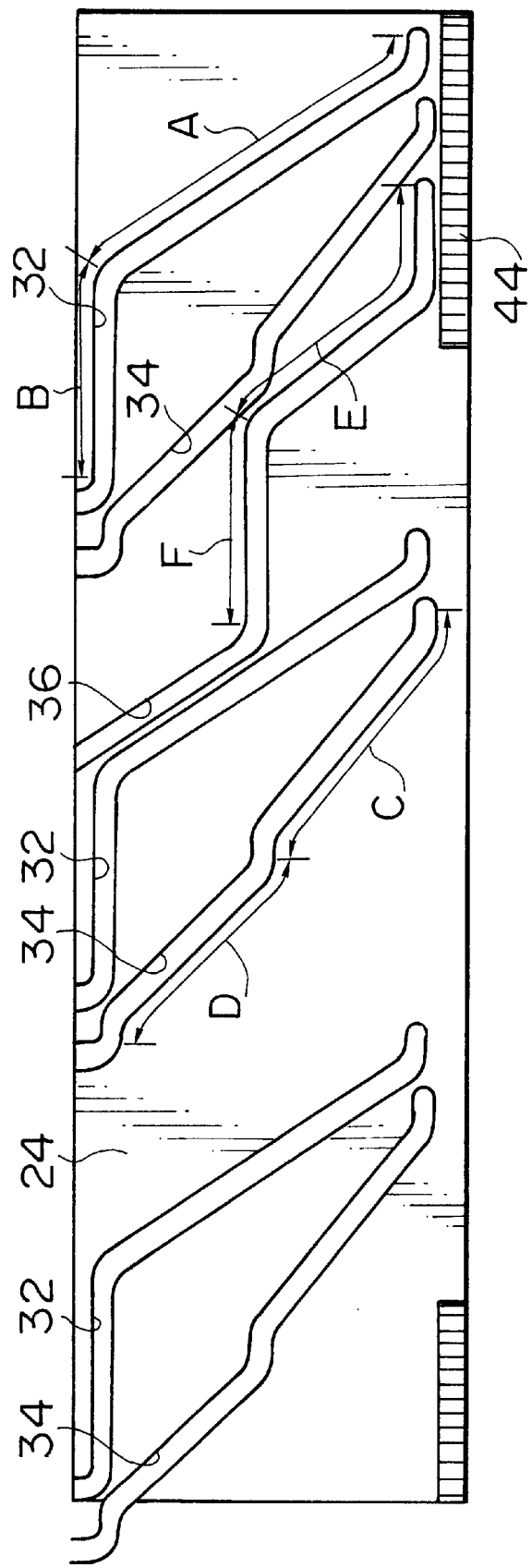
FIG. 8 is a development showing an inner periphery of a cam barrel.

The cam barrel 24 is shaped like a cylinder and mounted around the fixed barrel 20, and it can rotate. As shown in FIG. 8, three first cam grooves 32, three second cam grooves 34 and a third cam groove 36 are formed on the inner periphery of the cam barrel 24.

The first cam pins 28 arranged on the outer periphery of the movable barrel 22 are coupled with the first cam grooves 32 of the cam barrel 24 as well as the first slits 30 of the fixed barrel 20. Therefore, rotation of the cam barrel 24 moves the movable barrel 22 along the optical axis due to the first cam grooved 32 and the first slits 30.

As shown in FIG. 8, each first cam groove 32 is divided into an area A and an area B. The areas A guide the movable barrel 22 between a collapsed position and a projection position, and the areas B guide the movable barrel 22 to keep it at a projection position.

The cam barrel 24 is driven by a cam barrel driving motor 38 stored in the fixed barrel 20, and the mechanism of the cam barrel driving motor 38 will now be explained.

Figure 7:
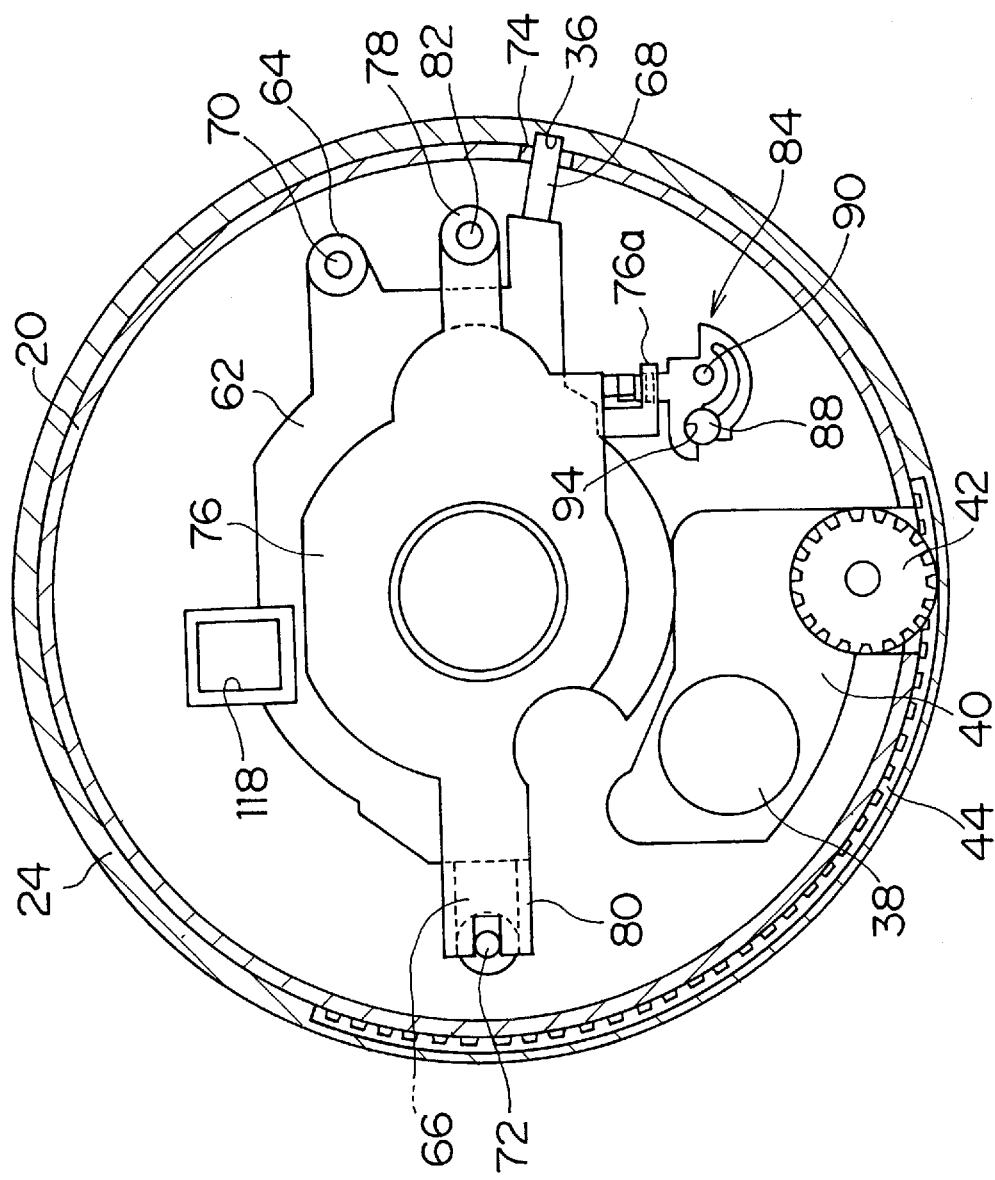
FIG. 7 is a section of the lens device along a 7—7 line in FIG. 2.

As shown in FIGS. 3, 5 and 7, the cam barrel driving motor 38 is fixed to the inner surface of the base 26 through a gear box 40. The gear box 40 has a reduction gear with a predetermined reduction ratio, and its input shaft is connected to the cam barrel driving motor 38 and its output shaft is connected to a driving gear 42. An internal gear 44 is provided on the inner periphery of the back end of the cam barrel 24 to engage with the driving gear 44. Driving the cam barrel driving motor 38 rotates the driving gear 42, and the rotation of the driving gear 42 is transmitted to the internal gear 44 to rotate the cam groove 24.

The cam barrel driving motor 38 is provided with a photo interrupter 45 for determining the rotation amount of the cam barrel 24. The photo interrupter 45 outputs pulses to a controlling part of the camera body according to the rotation amount of the output shaft of the cam barrel driving motor 38, and the controlling part counts the pulses outputted from the photo interrupter 45 to calculate the rotation amount of the cam barrel 24.

The structure of the taking lens 14 will now be explained. The taking lens 14 is composed of four lens groups, namely a fixed lens group 46, a zoom lens group 48, a relay lens group 50 and a focus lens group 52.

The fixed lens group 46 is held by a first lens frame 54, and a male screw 54a is formed on the outer periphery of the back end of the first lens frame 54. A female screw 22a is formed on the inner periphery of the front end of the movable barrel 22, and the female screw 22a is engaged with the male screw 54a to attach the first lens frame 54 to the front end of the movable barrel 22. Thus, the fixed lens group 46 moves together with the movable barrel 22.

A decorative ring 55 is attached to the front end of the movable barrel 22 with the fixed lens group 46.

Figure 6:
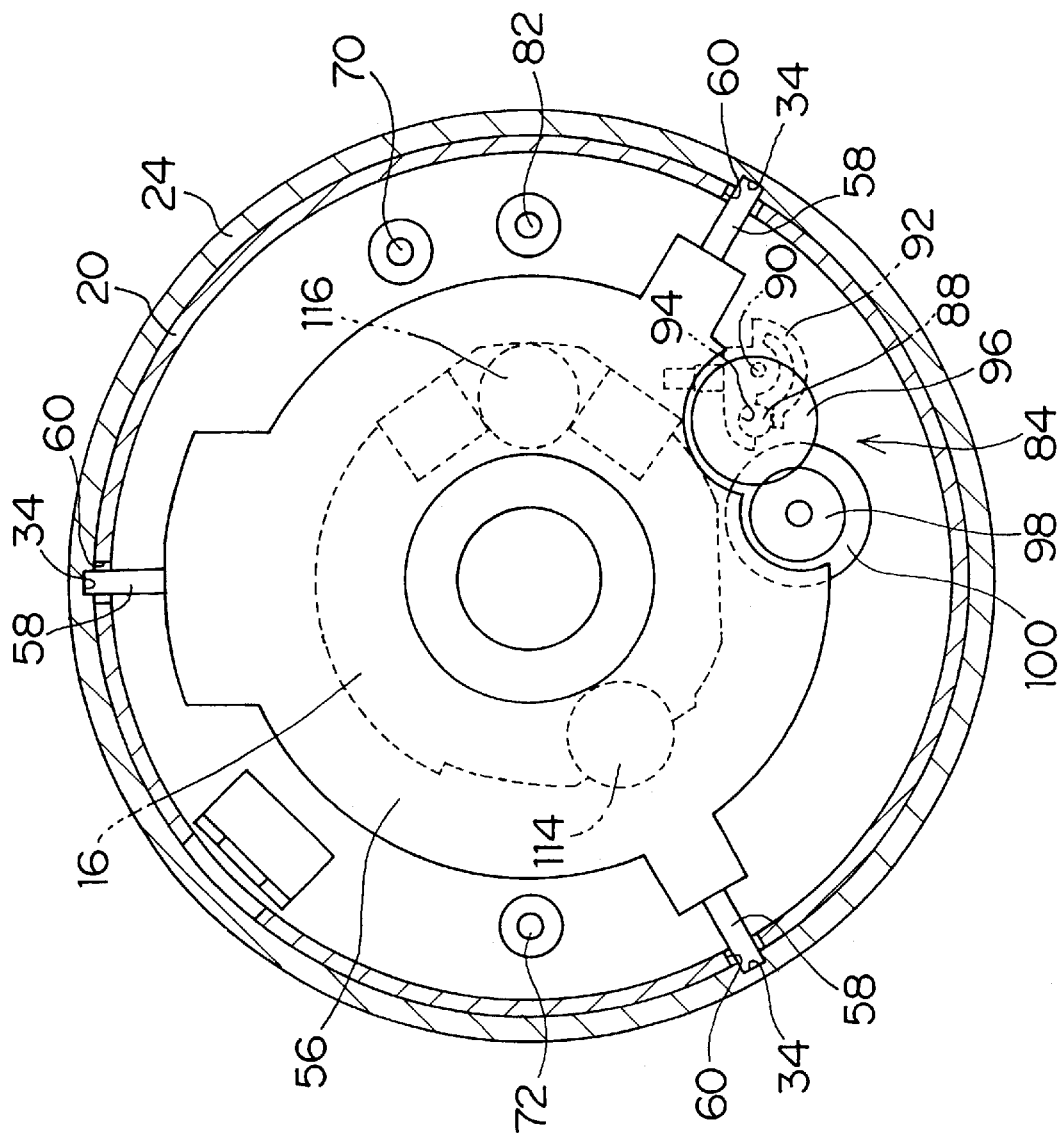
FIG. 6 is a section of the lens device along a 6—6 line in FIG. 2.

The zoom lens group 48 is arranged behind the fixed lens group 46 and held by a second lens frame 56. As shown in FIG. 6, three second cam pins 58 are formed on the outer periphery of the back end of the second lens frame 56 at regular intervals. The second cam pins 58 are coupled with three second slits 60 formed in the fixed barrel 20 along the optical axis.

This moves the second lens frame 56 along the optical axis in the fixed barrel 20.

The second cam pins 58 are also coupled with the second cam grooves 34 of the cam barrel 24. Thus, the rotation of the cam barrel 24 moves the second lens frame 56 along the optical axis due to the second cam grooves 34 and the second slits 60.

Each second cam groove 34 in FIG. 8 is divided into an area C and an area D. The areas C of the second cam grooves 34 in FIG. 8 guide the second lens frame 56 from a collapsed position to a wide-angle end, and the areas D guide the second lens frame 56 from the wide-angle end to a telephoto end.

The relay lens group 50 is arranged behind the zoom lens group 48 and held by a third lens frame 62. As shown in FIG. 7, two guide blocks 64 and 66 and a third cam pin 68 are arranged to the outer periphery of the third lens frame 62.

The guide blocks 64 and 66 are cylindrically shaped and U-shaped, respectively. The guide block 64 is coupled with a first guide bar 70 arranged in the fixed barrel 20, and the guide block 66 is coupled with a second guide bar 72 arranged in the fixed barrel 20.

As shown in FIGS. 2–4, the first guide bar 70 and the second guide bar 72 are arranged along the optical axis, and the back ends of them are fixed to the inner surface of the base 26. The front ends of them are supported by a front end support mechanism 104 arranged in the movable barrel 22 (the front end support mechanism 104 will be explained). The guide blocks 64 and 66 can slide along the first guide bar 70 and the second guide bar 72, and thus the third lens frame 62 can move along the optical axis in the fixed barrel 20.

As shown in FIG. 7, the third cam pin 68 is coupled with a third slit 74 formed in the fixed barrel 20 along the optical axis and a third cam groove 36 of the cam barrel 24. Thus, the rotation of the cam barrel 24 moves the third lens frame 62 along the optical axis due to the third cam groove 36 and the third slit 74.

As shown in FIG. 8, the third cam groove 36 includes an area E and an area F. The area E guides the third lens frame 62 between a collapsed position and a shooting position, and the area F guides the third lens frame 62 to keep it at the shooting position.

The focus lens group 52 is arranged behind the relay lens group 50 and held by a fourth lens barrel 76. As shown in FIG. 7, two guide blocks 78 and 80 are arranged on the outer periphery of the fourth lens frame 76.

The guide blocks 78 and 80 are cylindrically shaped and U-shaped, respectively. The guide block 78 is coupled with a third guide bar 82 arranged in the fixed barrel 20, and the guide block 66 is coupled with the second guide bar 72 arranged in the fixed barrel 20.

As stated above, the second guide bar 72 is coupled with the guide block 66 of the third lens frame 62. The third lens frame 62 and the fourth lens frame 76 share the second guide bar 72, and this gives a space for a motor or the like to the fixed barrel 20.

The third guide bar 82 is coupled with only the guide block 78 and arranged along the optical axis. The back end of the third guide bar 82 is fixed to the inner surface of the base 26, and the front end of it is supported by the front end support mechanism 104 like the first guide bar 70 and the second guide bar 72.

The guide blocks 78 and 80 can slide along the third guide bar 82 and the second guide bar 72, respectively, and this moves the fourth lens frame 76 along the optical axis in the fixed barrel 20.

The lens device 2 performs focusing by moving the fourth lens frame 76 along the optical axis, and a focus lens driving unit 84 drives the fourth lens barrel 76.

As shown in FIG. 4, a lead screw 86 is arranged along the optical axis in the fixed barrel 20, and it can rotate due to a bracket 88 fixed to the inner surface of the base 26. A guide rod 90 is arranged along the optical axis in the vicinity of the lead screw 86, and both ends of the guide rod 90 are fixed to the bracket 88.

A slider 92 is supported by the guide rod 90, and the slider 90 can slide along the guide rod 90. The slider 92 has a nut 94 that is engaged with the lead screw 86. The rotation of the lead screw 86 moves the slider 92 along the optical axis.

A following gear 96 is fixed to the front end of the lead screw 86 and engaged with a driving gear 98 fixed to an output shaft of a focus lens driving motor 100. The focus lens driving motor 100 is fixed to the bracket 88. Driving the focus lens driving motor 100 rotates the driving gear 98, and the rotation of the driving gear 98 is transmitted to the following gear 96 to rotate the lead screw 86. The rotation of the lead screw 86 moves the slider 92 along the guide rod 90.

The fourth lens frame 76 is connected to the slider 92 through a spring 102. Thus, the movement of the slider 92 moves the fourth lens frame 76. If the slider 92 is moved backward, the fourth lens frame 76 is pulled by the spring 102 to move backward. If the slider 92 is moved forward, the fourth lens frame 76 is pushed by the slider 92 to move forward. In this case, the slider 92 is in contact with a projection 76a projecting from the back surface of the fourth lens frame 76.

The fourth lens frame 76 moves along the optical axis by driving the focus lens driving motor 100 to move the slider 92. Since the fourth lens frame 76 and the slider 92 are connected with each other through the spring 102, the fourth lens frame 76 can be moved without backlash between the nut 94 and the lead screw 86. Therefore, the fourth lens frame 76 can be precisely moved.

Power is supplied and driving signals and so on are transmitted to the focus lens driving unit 84 through a flexible board 103 in FIG. 5.

The taking lens 14 is constructed in this manner. The relay lens group 50 is supported by the first guide bar 70 and the second guide bar 72, and the focus lens group 52 is supported by the second guide bar 72 and the third guide bar 82, as stated above. The front ends of the guide bars 70, 72 and 82 are supported by the front end support mechanism 104. The structure of the front end support mechanism 104 will now be explained.

As shown in FIGS. 2–5, the front end support mechanism 104 comprises a middle frame 106 and a presser ring 108.

The middle frame 106 is shaped like a cylinder and inserted in the movable barrel 22. The middle frame 106 can slide in the movable barrel 22. Three front end supporters 110 are arranged on the inner periphery of the back end of the middle frame 106 to support the front ends of the guide bars 70, 72 and 82. The front end supporters 110 are shaped like cylinders, and holes 110a are formed along the optical axis so that the front ends of the guide bars 70, 72 and 82 are inserted in the holes 110a.

The presser ring 108 is shaped like a ring and fixed to the inner surface of the back end of the movable barrel 22. The presser ring 108 restricts the backward movement of the middle frame 106 that slides in the movable barrel 22.

A pair of spring pins 108a are projecting from the inner periphery of the presser ring 108, and a pair of spring pins 106a are projecting from the inner periphery of the middle frame 106. Springs are laid between the spring pins 106a and 108a, and they force the middle frame 106 backward.

The operation of the front end support mechanism 104 will now be explained.

When the movable barrel 22 is projected, as shown in FIGS. 3 and 4, the middle frame 106 is at the back end of the movable barrel 22 since the springs 112 force the middle frame 106 backward. The front ends of the guide bars 70, 72 and 82 are inserted in the holes 110a of the front end supporters 110.

When the movable barrel 22 is collapsed, the middle frame 106 is pulled by the springs 112 to move backward. As shown in FIG. 2, after the front end supporters 110 come in contact with the guide blocks 64 and 78, the middle frame 106 moves forward against the forces of the springs 112. This enables the movable barrel 22 to collapse into the fixed barrel 20.

The front end support mechanism 104 supports the front ends of the guide bars 70, 72 and 82 as stated above, and thus the third lens frame 62 and the fourth lens frame 76 can be stably guided without shaking.

A pair of spring pins (not shown) as well as the spring pins 106a is provided on the inner periphery of the middle frame 106. One end of each spring 113 in FIG. 5 is hooked on each of the spring pins, and the other end of each spring 113 is hooked on the each of spring pins arranged on the second lens frame 56. The springs 113 force the middle frame 106 and the second lens frame 56 in such directions that they come closer to each other. This prevents the movable barrel 22 and the second lens frame 56 from shaking even when they move. There are gaps between the first cam pins 28 of the movable barrel 22 and the sides of the cam grooves 32 of the cam barrel 24, and there are gaps between the second cam pins 58 of the second lens frame 56 and the sides of the second cam grooves 34 of the cam barrel 24. These gaps would cause the movable barrel 22 and the second lens frame 56 to shake when they move, especially when they change moving directions, if it were not for the springs 113. The first cam pins 28 push the sides of the cam grooves 32 and the second cam pins 58 push the sides of the second cam grooves 34 due to the springs 113. Therefore, the movable barrel 22 and the second lens frame 56 can be precisely guided without shaking.

The structure of the diaphragm and shutter unit 16 will now be explained. As shown in FIGS. 2–4, the diaphragm and shutter unit 16 is provided between the zoom lens group 48 and the relay lens group 50, and fixed to the third lens frame 62. The diaphragm and shutter unit 16 has a diaphragm and a shutter (not shown). The diaphragm is opened or closed by a diaphragm motor 114, and the shutter is opened or closed by a shutter motor 116. The diaphragm motor 114 and the shutter motor 116 are both included in the diaphragm and shutter unit 16, and they operate according to driving signals outputted from the controlling part of the camera body. They drive the diaphragm and the shutter for predetermined f-number and shutter speed.

The power is supplied and the driving signals and so on are transmitted to the diaphragm and shutter unit 16 through a flexible board 122 in FIG. 5.

As shown in FIG. 7, a hole 118 is formed in the third lens frame 62, and the flexible board 122 is inserted into the hole 118. The hole 118 prevents the flexible board 122 from moving irregularly when the third lens frame 62 moves.

The structure of the CCD unit 18 will now be explained. As shown in FIGS. 2–4, the CCD unit 18 is arranged behind the focus lens group 52, and mounted in an opening 120 formed in the center of the base 26. The CCD unit 18 converts an incident light which has passed the taking lens 14 into video signals, which is outputted to the camera body through a main board 124.

The base 26 fixed to the back end of the fixed barrel 20 is attached to the camera body to attach the lens device 2 to the camera body. At this time, the lens device 2 is collapsed in the camera body, and the motors and so on are driven according to the driving signals outputted from the controlling part of the camera body.

The operation of the lens device 2 will now be explained.

As shown in FIG. 2, when the camera 1 is not being used, the movable barrel 22 is collapsed in the fixed barrel 20.

When the camera 1 is activated, the cam barrel driving motor 38 is driven to rotate the cam barrel 24 a predetermined amount. This projects the movable barrel 22 from the fixed barrel 20 to the projection position, and the second lens frame 56 and the third lens frame 62 move forward predetermined amounts. The zoom lens group 48 is at the wide-angle end, and the relay lens group 50 is at the shooting position.

The focus lens driving motor 100 as well as the cam barrel driving motor 38 is driven to move the fourth lens frame 76 forward a predetermined amount, and the focus lens group 52 is positioned at a predetermined position.

The lens device 2 becomes ready for a wide-angle shooting in this way.

During the projection operation, the third lens frame 62 and the fourth lens frame 76 are guided forward by the guide bars 70, 72 and 82. Since all the ends of the guide bars 70, 72 and 82 are supported, the third lens frame 62 and the fourth lens frame 76 can be stably guided.

The back ends of the guide bars 70, 72 and 82 are fixed to the base 26, and the front ends to them are inserted into the holes 110a of the front end supporters 110 of the middle frame 106.

The middle frame 106 with the front end supporters 110 can move in the movable barrel 22. When the lens barrel 2 is collapsed as shown in FIG. 2, the middle frame 106 is pulled by the springs 112 and stopped from moving backward by the guide blocks 64 and 78, and it is in the middle of the guide bars 70, 72 and 82.

When the movable barrel 22 is projected as shown in FIG. 3, the middle frame 106 is pressed by the presser ring 108 provided at the back end of the movable barrel 22 to move forward with the movable barrel 22. The middle frame 106 comes ahead of the guide bars 70, 72 and 82.

The front ends of the guide bars 70, 72 and 82 supported by the front end supporters 110 of the middle frame 106 can guide the third lens frame 62 and the fourth lens frame 76 without bending or shaking.

The following detecting mechanism detects that the zoom lens group 48 has comes to the wide-angle end.

As shown in FIG. 5, a photo reflector 128 is attached to the inner surface of the base 26 through an attaching plate 126, and a reflecting plate 130 is attached to the inner periphery of the cam barrel 24, and an opening 132 is formed in the fixed barrel 20. The photo reflector 128 is turned ON when the reflecting plate 130 comes to the opening 132. The reflecting plate 132 is arranged so that it comes to the opening 132 when the zoom lens group 48 is at the wide-angle end. This makes it possible to detect that the zoom lens group 48 has comes to the wide-angle end.

The following detecting mechanism detects that the focus lens group 52 has come to the predetermined position.

As shown in FIG. 5, a photo interrupter 136 is attached to the inner surface of the base 26 through an attaching plate 134, and an object (not shown) is attached to the fourth lens frame 76. The photo interrupter 136 is turned ON when the object comes to the photo interrupter 136. The photo interrupter 136 and the object are arranged so that the object comes to the photo interrupter 136 when the focus lens group 52 comes to the predetermined position. This makes it possible to detect that the focus lens group 52 has come to the predetermined position.

Power is supplied and signals are transmitted to the photo interrupters 45 and 136 and the photo reflector 128 through a flexible board 138.

The lens device 2 becomes ready for a wide-angle shooting in this way. If a zoom switch (not shown) of the camera body is operated toward a telephoto shooting at this time, the zoom lens group 48 moves toward the telephoto end. The cam barrel driving motor 38 is driven to rotate the cam barrel 24 in the same direction as during the projection, and the zoom lens group 48 moves toward the telephoto end. FIG. 4 shows the lens device 2 that is ready for a telephoto shooting.

During the zooming, the fourth lens frame 76 holding the zoom lens group 48 is guided along the guide bars 72 and 82. Since all the ends of the guide bars 72 and 82 are supported as stated above, the fourth lens frame 76 is stably guided.

The fixed lens group 46 and the relay lens group 50 do not move like the zoom lens group 48 during the zooming.

The position of the zoom lens group 48 can be determined from the rotation amount of the cam barrel 24. Since the movement amount of the zoom lens group 48 is in proportion to the rotation amount of the cam barrel 24, the position of the zoom lens group 48 can be determined from the rotation amount of the cam barrel 24 during the zooming.

The rotation amount of the cam barrel 24 can be calculated from the number of the pulses outputted from the photo interrupter 45 according to the rotation amount of the cam barrel driving motor 38.

The shooting preparation is completed in this way. When a user pushes the shutter release button 7, the focusing is performed according to the subject distance. During the focusing, the focus lens driving motor 100 is driven to move the focus lens group 52 from the predetermined position to a focusing position. Then, the diaphragm motor 114 and the shutter motor 116 are driven according to the exposure for the subject, and the shooting is performed with the desired f-number and shutter speed. After the shooting, the focus lens driving motor 100 is driven again to return the focus lens group 52 to the predetermined position.

When the power of the camera body is turned off, the movable barrel 22 is collapsed in the following way.

First, the focus lens driving motor 100 is driven to move the fourth lens frame 76 backward. After the focus lens group 52 comes to a predetermined position, the cam barrel 38 is driven to move the movable barrel 22, the second lens frame 56 and the third lens frame 62. The movable barrel 22 is collapsed into the fixed barrel 20 as shown in FIG. 2.

During the collapsing, the middle frame 106 supporting the front ends of the guide bars 70, 72 and 82 is pulled by the springs 112 to move backward. After the front end supporters 110 come in contact with the guide blocks 64 and 78 as shown in FIG. 2, the middle frame 106 moves forward against the forces of the springs 112 since it can slide in the movable barrel 22. This enables the movable barrel 22 to collapse in the fixed barrel 20.

The focus lens group 52 is withdrawn before the other lens groups as stated above. This prevents the relay lens group 50 from coming into contact with the focus lens group 52. The cam barrel driving motor 38 is driven so that the relay lens group 50 does not come into contact with the focus lens group 52.

Since all the ends of the guide bars 70, 72 and 82 are supported, the third lens frame 62 and the fourth lens frame 76 can be stably guided.

In addition, since the movable barrel 22 has the front end supporters 110, they can support the front ends of the guide bars 70, 72 and 82 without coming in contact with other members even if the structure of the lens barrel 12 is complicated for downsizing it.

Also, since the front end supporters 110 can move, they can support the front ends of the guide bars 70, 72 and 82 without coming in contact with other members even when the lens device 2 is being collapsed.

The middle frame 106 can slide in the movable barrel 22 in the embodiment, but it may be fixed to the inner periphery of the movable barrel 22 when it does not come into contact with the lens frames.

In addition, the present invention is applied to the electronic still camera 1 in the embodiment, but it may be applied to a silver halide camera.

As set forth hereinabove, while the lens frame is guided, both ends of the guide bar are supported even if the structure of the lens barrel is complicated for downsizing the lens device. Thus, the lens can be stably moved. Also, since the supporter can move, it can support the end without coming into contact with other members even when the lens device is being collapsed.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens device, comprising:
   a lens barrel including a movable barrel and a fixed barrel, wherein said movable barrel moves along an optical axis with respect to said fixed barrel;
   a support mechanism provided within the movable barrel, said support mechanism including a cylindrical middle frame and a presser ring, wherein said middle frame is slidable within the movable barrel;
   a lens frame holding a lens; and
   a guide bar that is arranged in the lens barrel to support said lens frame holding said lens so that the lens frame slides along the optical axis,
   wherein one end of the guide bar is fixed to a back end of the fixed barrel, and the other end of the guide bar is supported by the support mechanism provided within the movable barrel.

2. The lens device according to claim 1, wherein said support mechanism further includes a cylindrical, front end supporter positioned along an inner periphery of a back end of the middle frame and a hole formed along the optical axis, said other end of the guide bar being supported by the front end supporter and inserted through said hole.

3. A lens device, comprising:
   a lens barrel including a cam barrel, a movable barrel and a fixed barrel, said movable barrel being movable along an optical axis with respect to and within said fixed barrel, and said cam barrel being rotatable around said fixed barrel;
   a base engaged to a rear end of the fixed barrel;
   a taking lens, said taking lens including a fixed lens group, a zoom lens group, a relay lens group, and a focus lens group;
   a fixed lens, a zoom lens, a relay lens and a focus lens;
   a diaphragm and a shutter unit;
   a support mechanism provided within the movable barrel, said support mechanism including a cylindrical middle frame and a presser ring, wherein said middle frame is slidable within the movable barrel,
   a lens frame holding at least one of said fixed, zoom, relay and focus lenses;
   a plurality of guide bars being arranged in the lens barrel to support said lens frame so that the lens frame slides along the optical axis, wherein a first end of the guide bars is fixed to a back end of the fixed barrel, and a second end of the guide bars is supported by the support mechanism provided within the movable barrel.

4. The lens device according to claim 3, further comprising:
   a plurality of first cam pins arranged on an outer periphery of the movable barrel at a rear end thereof; and
   a plurality of first slits respectively corresponding to said first cam pins and being arranged at regular intervals within said fixed barrel, wherein said first cam pins are respectively coupled with said first slits and permitting a movement of said movable barrel along said optical axis.

5. The lens device according to claim 3, further comprising:
   a plurality of first cam grooves being formed along an inner periphery of the cam barrel;
   a plurality of second cam grooves being formed along the inner periphery of the cam barrel; and
   a third cam groove being formed along the inner periphery of the cam barrel.

6. The lens device according to claim 4, further comprising:
   a plurality of first cam grooves being formed along an inner periphery of the cam barrel, said first cam pins being coupled with the first cam grooves of the cam barrel in addition to being coupled with the first slits of the fixed barrel, wherein a rotation of the cam barrel provides the movement of the movable barrel along the optical axis;
   a plurality of second cam grooves being formed along the inner periphery of the cam barrel; and
   a third cam groove being formed along the inner periphery of the cam barrel, said first cam pins being coupled with the first cam grooves of the cam barrel in addition to being coupled with the first slits of the fixed barrel.

7. The lens device according to claim 3, further comprising a cam barrel driving motor being arranged within said fixed barrel.

8. The lens device according to claim 6, further comprising a cam barrel driving motor being arranged within said fixed barrel, said cam barrel driving motor providing a motive force for the rotation of the cam barrel.

9. The lens device according to claim 3, said fixed lens group including a first lens frame for holding said fixed lens, wherein said first lens frame is secured to a front end of the movable barrel and is movable therewith.

10. The lens device according to claim 8, said fixed lens group including a first lens frame for holding said fixed lens, wherein said first lens frame is secured to a front end of the movable barrel and is movable therewith.

11. The lens device according to claim 3, said zoom lens group including a second lens frame having an outer periphery, a plurality of second slits being formed within the fixed barrel along the optical axis, and a plurality of second cam pins being formed on the outer periphery of the second lens frame, wherein the second cam pins are coupled with said second slits and permit a movement of the second lens frame along the optical axis within the fixed barrel.

12. The lens device according to claim 10, said zoom lens group including a second lens frame having an outer periphery, a plurality of second slits being formed within the fixed barrel along the optical axis, and a plurality of second cam pins being formed on the outer periphery of the second lens frame, wherein the second cam pins are coupled with said second slits and permit a movement of the second lens frame along the optical axis within the fixed barrel.

13. The lens device according to claim 12, wherein said second cam pins are also coupled with the second cam grooves of the cam barrel.

14. The lens device according to claim 3, said relay lens group including a third lens frame, a pair of guide blocks, and a third cam pin, wherein said guide blocks and said cam pin are arranged along an outer periphery of the third lens frame, and said first ends of said guide bars being coupled with a respective guide block and said second ends of said guide bars being supported by said support mechanism.

15. The lens device according to claim 13, said relay lens group including a third lens frame, a pair of guide blocks, and a third cam pin, wherein said guide blocks and said cam pin are arranged along an outer periphery of the third lens frame, and said first ends of said guide bars being coupled with a respective guide block and said second ends of said guide bars being supported by said support mechanism.

16. The lens device according to claim 3, said focus lens group including a pair of guide blocks arranged along an outer periphery of the fourth lens frame.

17. The lens device according to claim 15, said focus lens group including a pair of guide blocks arranged along an outer periphery of the fourth lens frame, wherein said focus lens group is maintained in a position behind said relay lens group by a fourth lens barrel, and said relay lens group is positioned behind said zoom lens group that is positioned behind said fixed lens group.

* * * * *